No. 654,920. Patented July 31, 1900.
E. L. SARGENT.
SHUTTLE BOX MOTION FOR LOOMS.
(Application filed Mar. 26, 1900.)
(No Model.) 2 Sheets—Sheet 1.
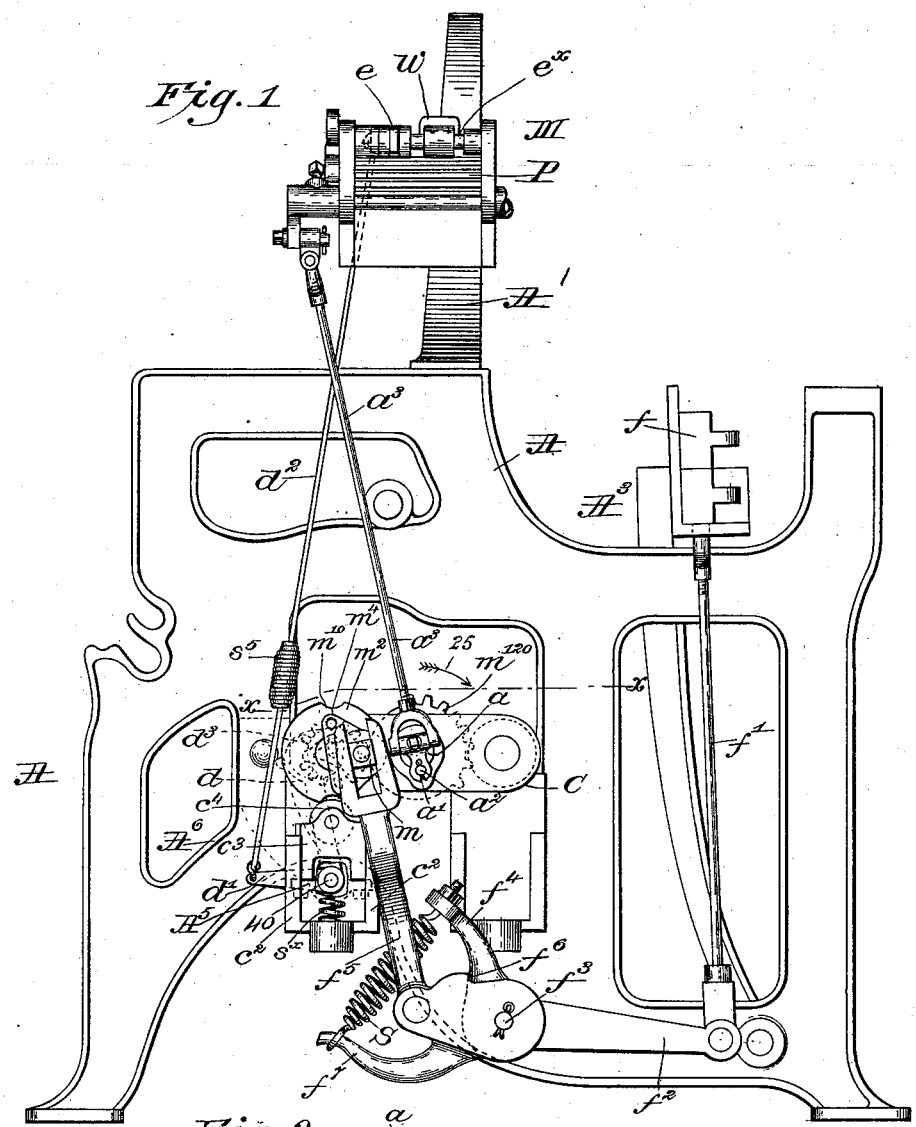
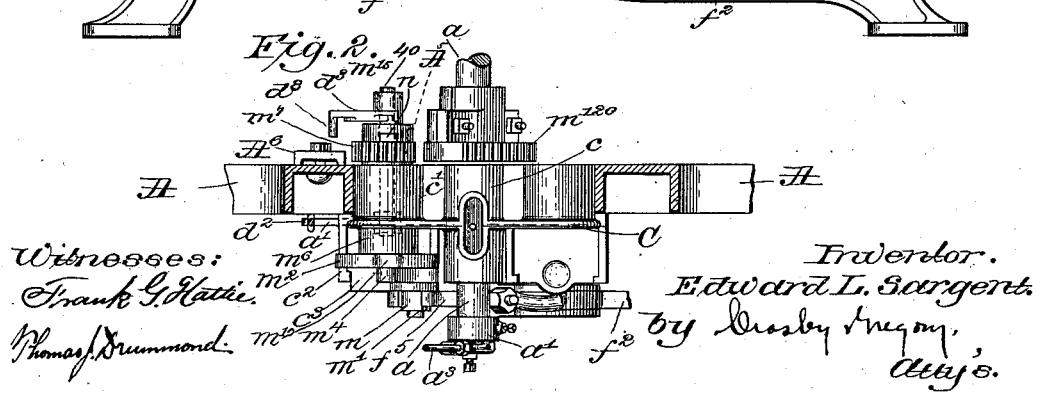
Witnesses: Inventor.
Frank G. Hattie. Edward L. Sargent.
Thomas J. Drummond. by Crosby Gregory,
Attys.

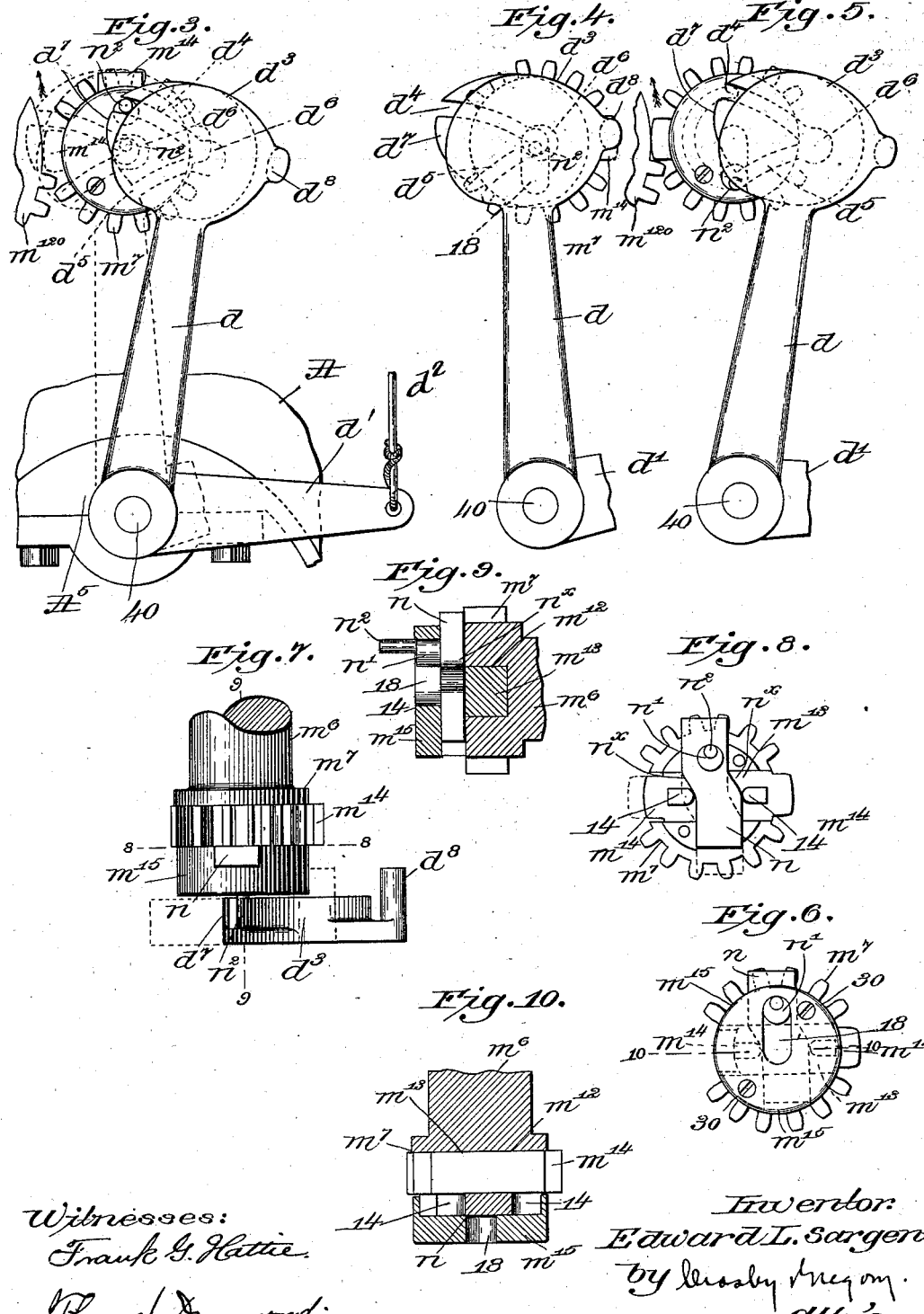

UNITED STATES PATENT OFFICE.

EDWARD L. SARGENT, OF TAUNTON, MASSACHUSETTS, ASSIGNOR TO THE MASON MACHINE WORKS, OF SAME PLACE.

SHUTTLE-BOX MOTION FOR LOOMS.

SPECIFICATION forming part of Letters Patent No. 654,920, dated July 31, 1900.

Application filed March 26, 1900. Serial No. 10,125. (No model.)

*To all whom it may concern:*

Be it known that I, EDWARD L. SARGENT, a citizen of the United States, and a resident of Taunton, county of Bristol, State of Massachusetts, have invented an Improvement in Shuttle-Box Motions for Looms, of which the following description, in connection with the accompanying drawings, is a specification, like characters on the drawings representing like parts.

This invention relates to box-motions for looms of that type wherein the movements of the shuttle-box are governed by or through a gear having a shifting or sliding tooth which moved into operative position constitutes a part of the series of peripheral teeth of the gear and effects rotation of the latter and when withdrawn into inoperative position prevents such rotation. One form of box-motion of this character forms a portion of the subject-matter of United States Patent No. 596,898, dated January 4, 1898; but therein, as in other devices of a similar character, the chain-motion operates the means for shifting the tooth, whereas in my present invention such chain-motion merely operates to exert a sufficiently-restraining effect to maintain the tooth in the desired position, the shifting thereof being otherwise effected. By the construction hereinafter described all danger of instability or uncertainty of action is practically eliminated. In the various devices of this character now in use, in which the function of the sliding tooth is to throw into or out of operation the mechanism governed by the gear of which said tooth forms a part, a shifting-lever is employed operatively connected with the chain-motion, and when it is desired to shift the tooth the lever is lifted by means of the chain, and when the gear is to be operated again the lever is dropped, usually with the assistance of a spring, thus bringing the weight and strain of the shifting mechanism upon the chain. By my present invention the force communicated by the chain-motion is employed to prevent the tooth from shifting, the strain of shifting being confined entirely to the gear of which it forms a part. Three important advantages accrue from such construction—viz., a positive locking of the shifting tooth in position, so that when in mesh it is practically a solid part of the gear; the simplicity, strength, and durability of parts forming the gear and tooth; and the self-shifting feature of the mechanism, as will more clearly appear hereinafter.

Figure 1 is a side elevation of a portion of a loom, showing the shuttle-box motion and pattern device with one embodiment of my invention applied thereto. Fig. 2 is a top or plan view of a portion of the mechanism shown in Fig. 1 below the line $x\ x$, the loom side being partly in section. Fig. 3 is an enlarged inner side elevation of the gear with the shifting tooth and the controlling means for the shifting mechanism, the parts being shown in position to prevent shifting at the first dwell, but ready to start. Fig. 4 is a similar view, but showing the sliding tooth-gear as rotated one hundred and eighty degrees and with the controlling means in the second dwell position. Fig. 5 is a like view, but showing the sliding tooth in operative position ready for the second start, the controlling means having returned to the full-line position, Fig. 3. Fig. 6 is a front elevation of the gear having the shifting or sliding tooth. Fig. 7 is a top or plan view of the parts shown in Fig. 3. Fig. 8 is a front view of the sliding-tooth gear on the line 8 8, Fig. 7, with the cap removed, but showing the shifter in elevation. Fig. 9 is a partial central longitudinal sectional view of Fig. 7 on the line 9 9; and Fig. 10 is a transverse section on the line 10 10, Fig. 6, the sliding tooth being, however, shown in elevation.

Referring to Fig. 1, the loom-frame A of suitable shape to contain the working parts, the cam-shaft $a$, mounted in the frame and having a crank-disk $a'$, provided with a wrist-pin $a^2$, to which is jointed the lower end of the connecting-rod $a^3$ for imparting motion to the chain and multiplying mechanism M, mounted on the arch $A'$ of the frame, the lay $A^3$, the shuttle-box $f$, supported on the lift-rod $f'$, which is jointed at its lower end to one arm $f^2$ of a bell-crank lever pivoted at $f^3$ on the frame, may be and are substantially as shown and described in the patent referred to and operating in substantially the same manner. The arm $f^2$ is upturned at $f^4$, while the arm $f^5$ of the bell-crank lever is fulcrumed at $f^3$ and provided with a shoulder $f^6$, held against the part $f^4$ by a strong spring S, connecting said part $f^4$ and an oppositely-extended prong $f^7$ of the arm $f^5$, the parts or extensions $f^4$ $f^7$ forming a species of separable yoke. The two members $f^2$ $f^5$ of the lever are thus normally locked together by the spring S; but should any undue stress be brought upon the said members in the operation of the loom the spring will yield and a smash will be prevented. The arm or member $f^5$ is forked to straddle a block $m$ upon a crank-pin $m'$ on the bridge $m^4$ of the face-plate $m^2$.

I have shown in Figs. 1 and 2 a bracket C, secured to the loom side A, having a bearing $c$, Fig. 2, for the shaft $a$ and a bearing $c'$ for the hub $m^6$ of the toothed wheel or gear $m^7$, to which hub, at its outer end, is secured the face-plate $m^2$, the bracket having below the said bearing $c'$ outwardly-extended upright guides $c^2$. These guides receive a slide-block $c^3$, having at its upper end a roller $c^4$, Fig. 1, adapted to enter one or the other of the opposite depressions $m^{10}$ in the face-plate $m^2$, a spring $s^x$, partly broken out in Fig. 1, acting on the bottom of the slide-block to hold the roller $c^4$ against the periphery of the face-plate, the roller serving to retain the plate in one or the other of the positions into which it is moved. A mutilated gear $m^{120}$ is secured to the crank-shaft $a$ adjacent the gear $m^7$, as clearly shown in Fig. 2, the number of teeth being such as to give one-half a revolution only to the gear $m^7$ when in engagement therewith, it being understood that the cam-shaft $a$ rotates continuously in the direction of the arrow 25, Fig. 1. Referring now more particularly to Figs. 6 to 10, the gear $m^7$ is diametrically slotted at $m^{12}$ to receive a shifting tooth-carrier shown as a slide-bar $m^{13}$, provided at each end with a tooth $m^{14}$, which teeth are adapted to enter spaces between the two series of teeth forming the gear $m^7$, the length of the said bar from one to the other extremity being herein shown such that when one tooth $m^{14}$ is in operative position the corresponding opposite tooth will be retracted into inoperative position, Figs. 6 and 8. A circular recessed cap $m^{15}$ is secured to the face of the gear $m^7$ by suitable means, as by screws 30, Fig. 6, extended into the gear at opposite sides of the slot $m^{12}$, it being manifest from Fig. 9 that the outer face of the slide-bar $m^{13}$ is flush with the face of the gear. A shifter, shown as a heavy block of metal $n$, is mounted to slide in the cap across the face of the tooth-carrier or slide-bar, the sides of the shifter having parallel cam-faces $n^x$, Fig. 8, substantially midway between its ends, which in said figure are shown as oppositely offset from the central longitudinal axis thereof, the cams $n^x$ being inclined relatively to such axis. Lugs 14 on the face of the slide-bar or carrier are arranged to contact with said cams, movement of the shifter at right angles to the slide-bar moving it in one or the other direction, so that, viewing Fig. 8, if the shifter $n$ is moved down into dotted-line position the slide-bar $m^{13}$ will be moved to the left and the left-hand tooth $m^{14}$ will be moved into operative position. The weight of the shifter $n$ is sufficient when permitted to move it into dotted-line position, Fig. 8, whenever the gear $m^7$ is in the position therein shown or to move the shifter into the extreme opposite position when the gear has been turned through one hundred and eighty degrees from such position, the shifter sliding freely in the cap. It is necessary, however, to control the movement of the shifter, and I have herein shown the latter as provided with a circular boss $n'$, projecting from its front face near one end, said boss entering a radial slot 18 in the cap $m^{15}$, (see Figs. 6 and 9,) the length of the slot being such that when the boss is at either end thereof the shifter $n$ will be in one of its extreme positions. A stud $n^2$ extends some distance from the boss eccentric to the center thereof and nearer the adjacent extremity of the shifter $n$, this stud being engaged by the controller now to be described, which governs the shifting of the sliding tooth, and thereby the operation of the shuttle-box motion.

On a bracket $A^6$, secured to the loom-frame, and in a bearing $A^5$ is fulcrumed a shaft 40, to which the controller (shown as practically a bell-crank $d$ $d'$) is secured, the arm $d'$ being connected by a wire $d^2$ with the inner end of a box-motion lever $e$, controlled by the pattern-surface P of the chain-motion M, Fig. 1, of any usual or well-known construction. The lever $e$ is fast on a rock-shaft $e^x$ and normally maintained with the inner end depressed by means of a weight W, Fig. 1, also attached to said rock-shaft. The inner end of the lever is raised at the proper time by usual pins or projections on the pattern-surface P, and the bell-crank $d$ $d'$ is rocked from the position, Figs. 1 and 3, into the position shown in Fig. 4. At its upper end the arm $d$ is enlarged to form a head $d^3$, which swings in a path closely adjacent and in front of the cap $m^{15}$, (see Figs. 2 and 7), the inner face of the head having two cam-grooves $d^4$ $d^5$ (shown in dotted lines, Figs. 3, 4, and 5) extending from a nearly-circular recess $d^6$ to the edge of the head, the grooves being adapted to receive the stud $n^2$, secured to the shifter.

Referring now to Fig. 3, the bell-crank controller is in normal position, maintained therein by its own weight, the inner end of the lever $e$ resting on the plain portion of the pattern-surface, and at such time the stud $n^2$ of the shifter is in its highest position, corresponding to that shown in Fig. 8, and it is so maintained because the stud is in the outer end of the cam-slot $d^4$ of the controller, and the tooth $m^{14}$ nearest the mutilated gear $m^{120}$ is retracted, so that said gear will not rotate the gear $m^7$. Now if it is desired to operate the box-motion a pin or projection on the pattern-surface P raises lever $e$ and through wire or link $d^2$ swings the controller to the left into dotted-line position, Fig. 3, and the weight of the shifter $n$ causes it to drop into dotted-line position, the cam slot or groove $d^4$ permitting it to descend, the shifter acting to shift the slide bar or carrier $m^{13}$ to the left to bring the tooth $m^{14}$ into operative position, and the driven gear $m^7$ will be rotated through one hundred and eighty degrees. Such half-revolution will cause the stud $n^2$ to travel in a circular path in the recess $d^6$ from above the axial center of the gear $m^7$ to directly below it, as in Fig. 4, and out of the inner end of the groove $d^4$, it being also manifest that the boss $n'$ is in the now upper end of the slot 18, and as the empty gap in the teeth of gear $m^7$ is then brought opposite gear or driver $m^{120}$ said gears will be out of mesh and will so continue as long as the controller remains in this second "dwell" position for any desired number of picks. If, however, the box-motion is to be again operated, the controller is released and will move into normal position, Fig. 5; but the stud $n^2$ will travel from the inner end of cam-groove $d^5$ to its outer end, the weight of the shifter $n$ causing it to drop, bringing the boss $n'$ to the lower end of slot 18, the stud passing out of the groove $d^5$, as in Fig. 5; but the shifter has also moved the tooth-carrier $m^{13}$ to the left, and the left-hand tooth $m^{14}$ will be moved into operative position, as in Fig. 5, and the driving and driven gears $m^{120}$ $m^7$ will be again in mesh. As before, the latter gear will be rotated through one hundred and eighty degrees, carrying the several parts into the first dwelling position, Fig. 3, the stud $n^2$ traveling around the edge cam $d^7$ between the outer ends of the grooves $d^4$ $d^5$ and into the outer end of the former, and the rotation will cease until the controller is again moved, as has been described, from dwelling position, full lines, Fig. 3, into second dwelling position, dotted lines in said Fig. 3, it being understood, however, that such movement of the controller permits the operation of the shifter to effect starting of the gear $m^7$. A lateral lug or stop $d^8$ on the head of the controller brings up against the cap when the controller reaches the second dwell position, Fig. 4, and so limits its movement when swung in such direction by or through the action of the pattern-surface.

In Fig. 1 a spring $s^5$ is shown forming a part of the link or wire $d^2$, tending to prevent jerking and allowing some play should the parts not operate smoothly, thus preventing smashing of the mechanism.

From the foregoing description it will be manifest that the shifting of the tooth-carrier is not effected by the direct operation of the pattern mechanism, but by the weight of the shifter, and the only strain brought upon said mechanism is that necessary to effect the slight movement of the controller from full to dotted line position, Fig. 3, thus relieving the pattern mechanism of all strain necessary to shift the tooth of the shifting-tooth gear, and by the mode of supporting the tooth-carrier in said gear the shifting tooth is practically a solid part of the gear when in operation.

Referring to Fig. 8, it will be seen that the lug 14 nearest the projected shiftable tooth is opposite the straight side portion of the shifter $n$ just past the end of the cam-face $n^\times$, so that the tooth will be locked in position so long as the shifter is prevented from moving relatively to the tooth-carrier $m^{13}$, and the shifter is so held from such movement at the proper time by the controller.

My invention may be modified or rearranged in various particulars without departing from the spirit and scope thereof.

Having fully described my invention, what I claim as new, and desire to secure by Letters Patent, is—

1. In a loom, a rotating shaft; a crank; a shuttle-box; a two-part lever intermediate said crank and shuttle-box to impart motion to the latter by and from the former, said members of the lever having a common fulcrum and provided with opposite extensions, a spring directly connecting said extensions forming a separable yoke, and a shoulder on one member normally maintained by the spring in engagement with the other member.

2. The combination with a moving toothed member constituting a driver, of a driven gear having a plurality of toothless spaces, rigidly connected, radially-shiftable teeth for said spaces, and a shifter normally actuated by gravity to move said teeth into and out of operative position.

3. The combination with a rotatable driving-gear, of a driven gear having a toothless space, a shiftable tooth carried thereby, and a shifter normally actuated by gravity to move said tooth into or out of operative position.

4. The combination with a rotatable driving-gear, of a driven gear having a toothless space, a shiftable tooth carried thereby, a shifter normally actuated by gravity to move said tooth into or out of operative position, and a controller to govern the movement of the shifter.

5. The combination with a movable toothed driving member, of a driven gear having a plurality of toothless spaces, rigidly-connected and radially-movable teeth carried by said gear, a gravity-actuated shifter for said teeth, also mounted on the gear, and means to control the gravity-induced movements of the shifter.

6. The combination with a movable toothed driving member, of a driven gear having a diametral slot in its face and toothless spaces opposite the ends thereof, rigidly-connected and radially-movable teeth in the slot, a shifter movable at right angles to said teeth, to effect their radial movement, and a cap secured to said gear and having guideways for the shifter.

7. The combination with a movable toothed driving member, of a driven gear having a plurality of toothless spaces, rigidly-connected and radially-movable teeth carried by said gear, a gravity-actuated shifter for said teeth, a slotted cap on the gear, having guideways for the shifter, and a boss on the shifter, movable in said slot in the cap, to limit the movement of the shifter.

8. The combination with a movable toothed driving member, of a driven gear having a plurality of toothless spaces, rigidly-connected and radially-movable teeth carried by said gear, a gravity-actuated shifter for said teeth, a slotted cap on the gear, having guideways for the shifter, a boss on the shifter and extended into the slot, to limit the movement of the shifter, and means to control the gravity-induced movement of the shifter relatively to the gear.

9. The combination with a rotatable driving-gear, of a driven gear having a toothless space, a radially-movable tooth therefor and a gravity-actuated shifter for the tooth, both movable bodily with the gear and movable relatively to each other, and means to control the gravity-induced movement of the shifter.

10. The combination with a rotatable driving-gear, of a driven gear having a toothless space, a shiftable tooth carried thereby, a gravity-actuated shifter to move said tooth radially, both being mounted on the gear, a stud on the shifter, and a controller having a cam portion to engage said stud and govern the gravity-induced movement of the shifter, and means to maintain the controller in position to lock the shifter from operative movement.

11. In a loom, the combination with a moving driving-gear; a driven gear having a plurality of toothless spaces; a shuttle-box, and operating connections between it and said driven gear; of rigidly-connected, radially-movable teeth for said toothless spaces, a shifter normally actuated by gravity to move the teeth into and out of position for engagement with the driving-gear, and a controller to determine the time of operation of the shifter.

12. In a loom, the combination with a moving driving-gear; a driven gear having a plurality of toothless spaces; a shuttle-box, and operating connections between it and said driven gear; of rigidly-connected, radially-movable teeth for said toothless spaces, and means normally actuated by gravity to move one tooth into operative, and the other tooth into inoperative position relative to the toothless spaces, and vice versa.

13. In a loom, the combination with a moving driving-gear; a driven gear having a plurality of diametrically-opposite toothless spaces; a shuttle-box and operating connections therefor between it and the driven gear; of shifting teeth for said spaces, mounted on the gear, a shifter also mounted on the gear to move said teeth into and out of position for engagement with the driving-gear, as required, and a controller to at times lock the shifter from operative movement.

14. In a loom, the combination with a moving driving-gear; a diametrically-slotted driven gear having toothless spaces at the ends of the slots, a slide-bar in said slot, having a tooth at each end, a shuttle-box, and operating connections between it and the driven gear, of a gravity-actuated shifter mounted on the driven gear and operatively connected with said slide-bar, movement of the shifter effecting movement of the slide-bar to place one tooth in operative position and the other in inoperative position, whereby intermitting rotation will be transmitted to the driven gear and movement imparted to the shuttle-box.

15. In a loom, the combination with a moving driving-gear; a driven gear having a toothless space; the shuttle-box; and its operating mechanism actuated by the driven gear; of a movable tooth for the latter, a gravity-actuated, sliding shifter mounted on the driven gear and movable relatively to the tooth, to shift the latter into and out of position for engagement with the driving-gear, and means to control the gravity-induced movement of the shifter.

16. In a loom, the combination with a moving driving-gear; a driven gear having a toothless space; the shuttle-box; and its operating mechanism actuated by the driven gear; of a movable tooth for the latter; a shifter normally actuated by gravity to shift the tooth into and out of position for engagement with the driving-gear, a controller to govern the gravity-induced movement of said shifter, a pattern-surface, and connections between it and the controller, to determine the movement of the shifter by or through the controller.

17. In a loom, the combination with a moving driving-gear; a driven gear having a toothless space; the shuttle-box; and its operating mechanism actuated by the driven gear; of a movable tooth for the latter, a shifter normally actuated by gravity to shift the tooth into and out of position for engagement with the driving-gear, a controller to at times lock the shifter from operative movement, and a pattern-surface operatively connected with the controller, to effect movement of the latter into locking or unlocking position.

18. The combination with a moving toothed member constituting a driver, of a driven gear having a toothless space, a shiftable tooth, a shifter to move it into and out of operative position, said tooth and shifter both being mounted on the gear, and means controlled by the position of the shifter to lock the tooth in operative position.

19. The combination with a moving toothed member constituting a driver, of a driven gear having a toothless space, a shiftable tooth on the gear, a relatively-movable shifter for said tooth, also mounted on the gear, means to prevent movement of the shifter relatively to the tooth, and a lug on one to coöperate with a locking-face on the other, to maintain the tooth in operative position.

20. The combination with a moving toothed member constituting a driver, of a driven gear having a toothless space, a shiftable tooth radially movable on said gear, a shifter movable at right angles to the tooth and having a cam-face and a straight locking-face, and a coöperating projection on the tooth, movement of the shifter effecting movement of the tooth by coöperative engagement of the cam-face and lug, the locking-face engaging said projection when the tooth is in operative position and maintaining the tooth operative.

In testimony whereof I have signed my name to this specification in the presence of two subscribing witnesses.

EDW. L. SARGENT.

Witnesses:
HORACE A. CROSSMAN,
GEORGE E. CHANDLER.

It is hereby certified that in Letters Patent No. 654,920, granted July 31, 1900, upon the application of Edward L. Sargent, of Taunton, Massachusetts, for an improvement in "Shuttle-Box Motions for Looms," an error appears in the printed specification requiring correction, as follows: On page 3, line 95, the clause "forming a separable yoke," should be stricken out and inserted after the word "extensions," line 93, as now numbered, same page; and that the said Letters Patent should be read with this correction therein that the same may conform to the record of the case in the Patent Office.

Signed, countersigned, and sealed this 14th day of August, A. D., 1900.

[SEAL.]

F. L. CAMPBELL,
*Assistant Secretary of the Interior.*

Countersigned:
    WALTER H. CHAMBERLIN,
        *Acting Commissioner of Patents.*